Oct. 10, 1961  P. NUNEZ, JR  3,003,245
GAUGE DEVICE FOR EXTRUSION GATE MEANS
Filed July 13, 1959
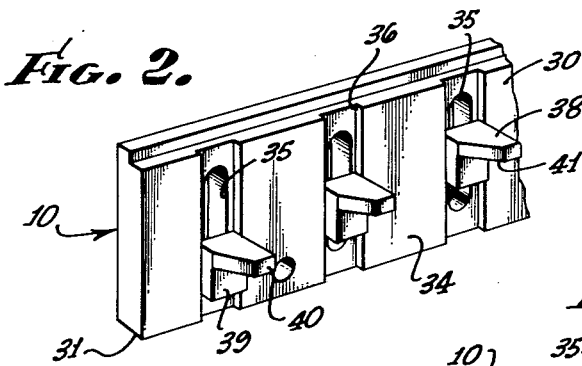
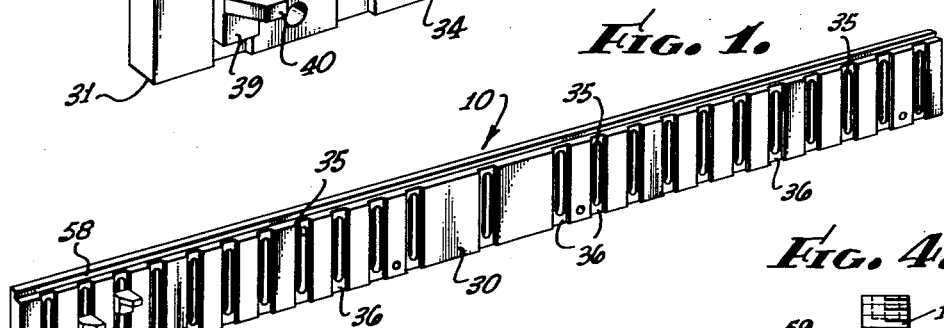
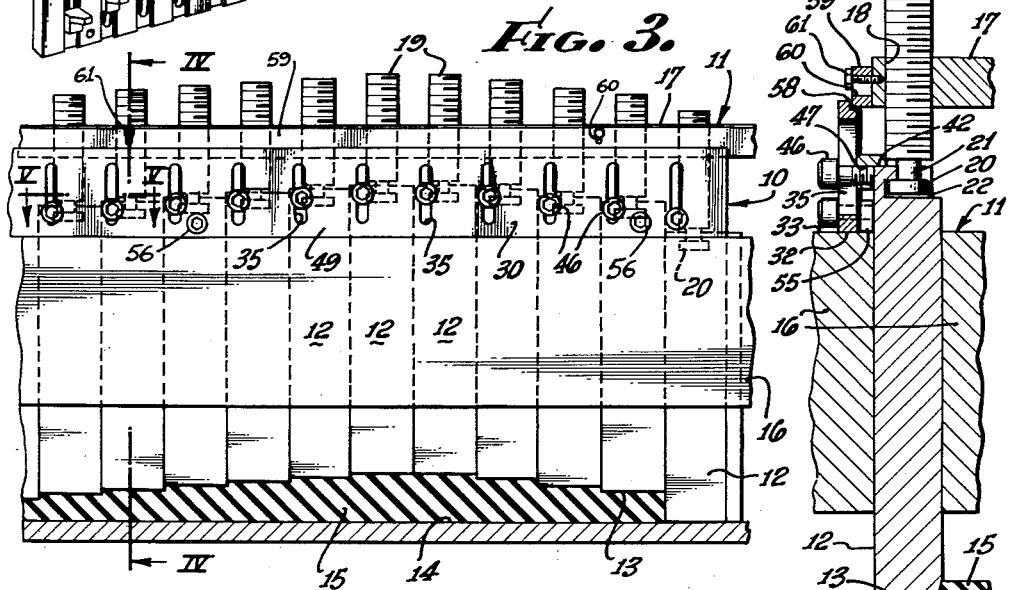
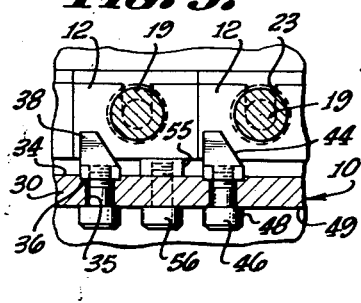
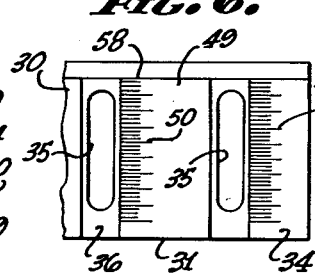
INVENTOR.
PETER NUNEZ, JR.
BY Miketta and Glenny
ATTORNEYS.

United States Patent Office 3,003,245
Patented Oct. 10, 1961

3,003,245
GAUGE DEVICE FOR EXTRUSION GATE MEANS
Peter Nunez, Jr., Montebello, Calif.
Filed July 13, 1959, Ser. No. 826,656
6 Claims. (Cl. 33—180)

This invention relates to an adjustable template gauge device for use on extrusion die or gate means and more particularly to a gauge device providing rapid change of settings of a plurality of gate members of a rubber extrusion die such as used in the production of tread sections for vehicle tires.

In the extrusion of tread sections for vehicle tires, a continuously flowing plastic mass of rubber material is extruded or pressed through a die gate means having an opening to form the mass into a selected tread section. Tread sections may vary for different size and types of tires and the die gate means must be readjusted to vary extrusion opening to produce the specified tread section. The usual practice in the extrusion of such treads is to adjust gate members during the flow of the rubber material. Prior proposed procedures included the manual adjustment of each of the plurality of gate members by trial and error by the operator. The time required for complete adjustment of the gate members depended entirely upon the skill and experience of the operator and sometimes required from one to three hours. The rate of flow of material passing through the extrusion gate may vary between 100 inches and 500 inches per minute, this rate depending upon the composition of the extruded material, heat, pressure and other factors. It is thus evident that when the gates are adjusted during continuous flow of material, a large amount of extruded material will not meet specifications of the desired tread section and therefore must be scrapped. Production efficiency is considerably reduced under such prior procedures.

The present invention contemplates a means whereby the time for adjustment of the plurality of gate members may be reduced to a minimum, the gate members immediately and virtually precisely positioned to provide a desired gate opening for a specified tread section, the amount of scrap material greatly reduced, the production time more effectively and efficiently used.

It is therefore the primary object of this invention to provide an adjustable template gauge device for use with a plurality of gate members to selectively position such members to define a gate opening which will produce a desired specified extruded section of material.

An object of the invention is to provide a gauge device which may be readily handled and readily adjusted to a predetermined extrusion gate setting.

Another object of this invention is to provide a gauge device which may be quickly and precisely positioned with respect to gate members of an extrusion gate means to facilitate individual adjustment of each gate member.

A further object of this invention is to provide a gauge device which includes indicia means to facilitate presetting of the gauge faces on the gauge device.

A still further object of this invention is to provide a gauge device which includes means cooperable with an extrusion gate means for retaining the device in selected position with respect thereto.

A more specific object of the invention is to disclose and provide an adjustable template gauge device having a plurality of gauge stop elements, each having a gauge face disposed for contact with a gauge engagement surface on a related gate member of the extrusion gate means.

Another specific object of the invention is to provide a gauge device as described above wherein guide means are provided for each of said gauge stop members or elements.

Generally speaking, the template gauge device contemplated by this invention includes an elongated rigid bar having a plurality of spaced parallel slots therein, each slot providing an adjustable mounting for a gauge stop member or element. Each gauge member is positioned for association with a related gate member and has a gauge face or a forwardly projecting portion thereof for engagement with the gate member. Securement means are provided for the gauge member and each gate member may be moved by the usual means into engagement with the gauge face for precise positioning of the gate member to provide the specified tread section. The gauge device includes positioning means for locating the gauge bar in desired relation to the gate members and retaining means carried by a gate support member may cooperate with the gauge bar to positively retain the bar in position during adjustment of either the gate members or the gauge stop elements.

Many other objects and advantages of this invention will be readily apparent from the following description of the drawings in which an exemplary embodiment of the invention is shown.

In the drawings:

FIG. 1 is a front perspective view of an adjustable template gauge device embodying this invention, only a few of the gauge stop members being shown for purposes of clarity.

FIG. 2 is an enlarged fragmentary perspective view of a portion of the gauge device shown in FIG. 1 and showing in detail the arrangement of the gauge stop members.

FIG. 3 is a fragmentary side elevation of a portion of an extrusion gate means with the gauge device of FIG. 1.

FIG. 4 is a sectional view taken in the plane indicated by line IV—IV of FIG. 3.

FIG. 5 is a sectional view taken in the plane indicated by line V—V of FIG. 3.

FIG. 6 is a fragmentary view of the back face of the gauge device shown in FIG. 1 showing indicia thereon.

To facilitate understanding of the purpose and operation of the adjustable template gauge device generally indicated at 10, reference is first made to FIGS. 3 and 4 wherein the gauge device 10 is shown with an extrusion gate means generally indicated at 11. The extrusion gate means 11 may comprise a plurality of vertically adjustable gate members 12 of relatively narrow width and arranged in adjacent, parallel, side-by-side contact. The gate members 12 have bottom faces 13 defining with a bottom die surface 14 an opening of preselected shape and configuration through which a body of rapidly moving flowing plastic material 15 may be extruded under pressure. As apparent from FIG. 3, the plurality of gate members 12 provide a progressively, incrementally stepped configuration of the top edge of the gate opening.

The plurality of gate members 12 may be positioned or held against movement in the direction of the flow path of material 15 by a pair of parallel holding members 16 which extend transversely across the flow path of material 15 and above die surface 14. Above holding members 16 may be provided a transversely extending gate support member 17 having a plurality of transversely spaced, threaded bores 18 in threaded engagement with adjustment screws 19 connected to and vertically supporting the gate members 12. The bottom end of each adjustment screw 19 may be provided with an enlarged head 20 connected to the shank of the screw 19 by a reduced neck 21 of selected length. The top portion of each gate member 12 may be provided with a recess 22 which receives head 20 and a slot 23 in which neck 21 may be received. It will thus be apparent that upon rotation of adjustment screw 19 in either direction, the head 20 is permitted rotation within recess 22 and bears against walls of the recess to cause the gate member 12 to move upwardly or downwardly according to the direction of rotation of screw 19. Such vertical adjustment of gate member 12 varies the opening between the bottom face 13 of the gate member and the die face 14.

It will be understood that the extrusion gate means 11 described above exemplarily illustrates one form of extrusion gate means or die means and that other constructions of extrusion gate means may be provided.

The adjusable template gauge device 10 may comprise an elongated rigid metal bar 30 of polygonal cross section and having a selected length sufficient to overlie the plurality of gate members 12. The bar 30 may have a finished positioning edge face 31 adapted to seat as at 32 on a holding member 16, the seating surface 33 of the holding member being a finished surface and serving as a reference surface for adjustment of the gate members 12 with respect thereto. The bar 30 may have a front face 34 adapted to face gate member 12, said front face being provided with a plurality of vertically extending or transversely directed through slots 35. Slots 35 are made in selected spaced relation to correspond with the number and width of the gate members 12 so that each slot 35 will be positionable opposite a portion of a gate member 12 when the gauge device is placed upon the seating surface 33 of holding member 16. In the example shown in FIG. 1, it will be noted that the spacing of the slots 35 at the central portion of the bar varies from the spacing of the slots at end portions of the bar, such variation in spacing being exemplarily shown as a specific embodiment of a gauge device for use in extruding a tread section for a vehicle tire.

The front face 34 of bar 30 also has a vertically extending guide recess 36 at each slot 35 and having a width slightly greater than the width of slot 35. The guide recesses 36 provide positive means for slidably positioning and holding in desired alignment a plurality of gauge stop members 38.

The plurality of gauge stop members 38 at said slots 35 are adapted to be selectively adjusted in order to provide progressively incremental adjustment of the plurality of gate members 12 to provide a selectively configured gate or die opening. Each stop member 38 may comprise a body portion 39 having parallel sides adapted to slidably engage side walls of the associated recess 36 and to thereby position a forwardly projecting portion 40 in a selected plane. Forwardly projecting portion 40 extends from the body portion 39 a sufficient distance so that a gauge face 41 provided on the bottom surface of portion 40 may contact and engage as at 42 a gauge engagement surface provided on the top end face of an associated gate member 12. The portion 40 includes a bevel face 44 adapted to provide ample clearance between the projecting portion 40 and the adjustment screw 19 for the associated gate member 12.

Means to secure each gauge stop member 38 in its respective slot 35 and recess 36 may comprise a securement bolt 46 having a shank extending through slot 35 into threaded engagement at 47 with the body portion 39 of the stop member 38. The bolt 46 has an enlarged head 48 adapted to bear against the back face 49 of the bar 30.

In order to facilitate quick accurate positioning of each stop member 38, the front face 34 may be provided at each slot 35 with indicia 50 in selected intervals. The indicia 50 may be calibrated so that each indicia mark may represent the precise spacing between the bottom face 13 of the gate member and the die face 14 when the gauge face 41 is seated on the gauge engagement surface on member 16. Each gauge face 41 may be readily aligned with an adjacent indicia mark in order to preset the stop member.

In order to permit free adjustment of the stop members when the gauge device is positioned adjacent the gate members 12, a plurality of longitudinally spaced spacer blocks 55 may be secured to the front face of the bar 30 by securement bolts 56. The width of spacer blocks 55 is slightly greater than the width of body portion 39 so that the forwardly directed surfaces on body portion 39 will not engage in contact with the opposed surface of gate member 12.

The utility of this adjustable gauge device 10 will be readily apparent to those skilled in the art of extruding treads for vehicle tires. In such extrusion, the flow of material continues during changes of configuration of the tire tread and material extruded during the process of change is rejected and becomes scrap. Since the rubberplastic material is flowing at a rapid rate, a considerable quantity of extruded material is scrapped during such a change.

With the above described gauge device, rapid changes in the setting of the gate members 12 may be effected. The gauge device 10 may be preset for a selected gate opening to produce a selected extruded section. In such instance during the extrusion process of the selected form, the gauge device may be positioned on the positioning surface 33 of the gate holding member 16 and each stop member adjusted until the gauge face 41 is provided seating engagement with the gauge engagement surface on the gate member at 42. The gauge device is thus now set for providing the same gate opening as that found to produce the desired extruded section. The seating of each stop member may be noted on the indicia 50 in the event the stop member settings are required to be changed for a different extruded section.

When the stop members have been preset upon a gauge device 10 and it is desired to change the section being extruded, such change in the setting of the gate members is rapidly accomplished by positioning the preset gauge device on the seating surface 33 and then successively adjusting the adjustment screws 19 so as to vertically position the gate members 12 in accordance with the gauge setting defined by the gauge faces 41 on the plurality of stop members. It will be apparent to those skilled in the art that such a change in the position of the gate members may be quickly accomplished and the amount of scrap will be reduced to a minimum.

When a preset gauge device 10 is to be used for adjustment of the extrusion gate opening and the production schedule requires the extrusion of a number of different tread sections of different size and shape, rapid adjustment of the extrusion gate means will be facilitated if the tread sections of smaller size and shape are first scheduled and run. A gauge device 10 for the tread section of next successively larger shape or size may be then utilized for the adjustment of the gate opening and when positioned on the gate means, it will be readily apparent that the gate members will be moved upwardly against the gauge faces to produce the next larger tread section. Such successive scheduling of tread sections of increasing size and shape will provide a minimum of scrap material and a minimum of time lost in the adjustment of the gate means.

It will be apparent that in order to rapidly adjust such a plurality of gate members, the gauge device 10 should be retained in a selected position during all of the adjustments. For this purpose, the gauge bar may be provided with a longitudinally extending recess 58 in the top front edge thereof for engagement with two or more bar retaining elements 59 carried by the gate support member 17 for securing the bar against movement. The retaining elements 59 may be of any suitable shape and construction. For example, each element 59 may have an elongated vertical slot 60 which may receive a retaining bolt 61 therethrough, said bolt being threaded into a threaded bore in the face of gate support member 17. Vertical adjustment of element 59 is readily made so that it will tightly seat in recess 58 to restrain movement of bar 30 during adjustment of either stop members 38 or gate members 12.

It will be understood by those skilled in the art that various modifications and changes may be made in the gauge device described above which come within the spirit of this invention and all such changes and modifications coming within the scope of the appended claims are embraced thereby.

I claim:

1. An adjustable template gauge device for use with an extrusion gate means for extruding plastic material such as rubber and the like, comprising: an elongated bar of polygonal section having a positioning edge face, a front face, a plurality of parallel through slots arranged transversely of the bar in spaced relation, and a guide recess in said front face at each slot; a plurality of gauge stop members opposite said slots, each stop member including a body portion slidable in said recess and a forwardly projecting portion having a gauge face; and a plurality of bolts extending through said slots and in threaded engagement with said body portions for adjustably securing said stop members with said gauge faces in predetermined relation.

2. A gauge device as stated in claim 1 wherein indicia are provided on said front face at each slot for indicating the position of said gauge face.

3. A device as stated in claim 1 including spacer means on said bar for positioning said bar in selected spaced relation to an associated gate means.

4. A gauge device as stated in claim 1 wherein said positioning edge face on said bar is formed by a longitudinally extending recess at the top margin of said front face.

5. A gauge device as stated in claim 1, wherein said gauge face lies in a plane extending longitudinally and perpendicularly to the plane of said elongated bar.

6. An adjustable template gauge device for use with an extrusion gate means for extruding plastic material such as rubber and the like, comprising: an elongated bar having a positioning edge face, a front face, a plurality of parallel through slots arranged transversely of the bar in spaced relation, and a guide means at the front face adjacent each slot; a plurality of gauge members opposite said slots at said front face, each gauge member including a guide portion cooperable with said guide means and a forwardly projecting portion having a gauge face; and securement means for each gauge member extending through said slots and in holding engagement with the associated gauge member.

References Cited in the file of this patent
UNITED STATES PATENTS

| | | |
|---|---|---|
| 889,224 | Haas | June 2, 1908 |
| 1,012,372 | Landenberger | Dec. 19, 1911 |
| 2,266,457 | Wolff | Dec. 16, 1941 |